United States Patent
Sano et al.

(10) Patent No.: US 7,245,631 B2
(45) Date of Patent: Jul. 17, 2007

(54) MULTIPLEX COMMUNICATION APPARATUS FOR VEHICLE

(75) Inventors: Yoshiaki Sano, Tokyo (JP); Kenji Hayase, Tokyo (JP); Naoki Kawashima, Tokyo (JP); Masahiro Kaneda, Tokyo (JP); Yoshitaka Yahata, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 941 days.

(21) Appl. No.: 10/343,852

(22) PCT Filed: Apr. 26, 2002

(86) PCT No.: PCT/JP02/04282

§ 371 (c)(1),
(2), (4) Date: Feb. 5, 2003

(87) PCT Pub. No.: WO02/089419

PCT Pub. Date: Nov. 7, 2002

(65) Prior Publication Data

US 2003/0128111 A1    Jul. 10, 2003

(30) Foreign Application Priority Data

Apr. 27, 2001 (JP) .............................. 2001-132363

(51) Int. Cl.
*B60Q 1/00* (2006.01)
(52) U.S. Cl. ........................ 370/463; 340/438; 370/311
(58) Field of Classification Search ................ 370/230, 370/235, 459, 230.1, 463, 311; 455/422.1; 340/500, 575, 459, 425.5
See application file for complete search history.

(56) References Cited

U.S. PATENT DOCUMENTS

| | | | |
|---|---|---|---|
| 4,698,748 A | 10/1987 | Juzswik et al. | |
| 5,600,839 A | 2/1997 | MacDonald | |
| 5,974,056 A | 10/1999 | Wilson et al. | |
| 6,195,597 B1 * | 2/2001 | Yamada | 455/550.1 |
| 6,802,014 B1 * | 10/2004 | Suurballe | 713/300 |

FOREIGN PATENT DOCUMENTS

| | | |
|---|---|---|
| DE | 19721740 A1 | 11/1998 |
| JP | 08-275274 A | 10/1996 |
| JP | 09-135257 A | 5/1997 |
| JP | 2000-32018 A | 1/2000 |

* cited by examiner

*Primary Examiner*—Hassan Kizou
*Assistant Examiner*—Mounir Moutaouakil
(74) *Attorney, Agent, or Firm*—Birch, Stewart, Kolasch & Birch, LLP (57) ABSTRACT

An automotive multiplex communication system is provided, which is capable of determining the fulfillment of conditions to make a transition to a sleep state with a simplified system configuration and with simplified determination processing. This communication system is provided with a particular communication node and a plurality of ordinary communication nodes. When a communication-continuing request is not determined from pieces of first information respectively delivered from the ordinary communication nodes, the particular communication node delivers a sleep-transition command signal to the ordinary communication nodes. The ordinary communication nodes enter their sleep state in accordance with the sleep-transition command signal from the particular communication node, without individually determining the necessity to make a transition to the sleep state.

12 Claims, 6 Drawing Sheets

MULTIPLEX COMMUNICATION APPARATUS FOR VEHICLE

This application is the national phase under 35 U.S.C. § 371 of PCT International Application No. PCT/JP02/04282 which has an International filing date of Apr. 26, 2002, which designated the United States of America.

BACKGROUND OF THE INVENTION

1. Field of the Invention

The present invention relates to a multiplex communication system, and more particularly, to an automotive multiplex communication system having a sleep control function.

2. Description of the Related Art

An automobile mounted with electrical equipment units such as sensors, electronic control units (ECUs), actuators is generally provided with a multiplex communication system for data transfer between the electrical equipment units. The multiplex communication system is comprised of a multiplex transmission path and communication nodes connected thereto, and one or more electrical equipment units are connected to each communication node. In the multiplex communication system, communication nodes are rendered operative when supplied with electric power, making it possible to carry out data transfer between electrical equipment units through the communication nodes. If electric power is always supplied to these nodes, however, power consumption increases, thus increasing loads of a battery and a generator.

In this regard, there have been proposed multiplex communication systems provided with a sleep mode where power supply to communication nodes is suppressed when no data transfer is performed therebetween. In a multiplex communication system of this kind, each communication node determines the necessity of making data transfer between itself and other nodes and enters a sleep mode (more generally, a sleep state) to suppress power consumption when no data transfer is required.

For example, JP-A-9-135257 discloses a multiplex communication system in which each node transmits, when incapable of making a transition to a sleep state, a notification signal to other nodes with which own node can communicate, and on the other hand, each node permits the own node to enter the sleep state, when capable of making a transition to the sleep state and when not receiving a notification signal from any one of the other nodes for a predetermined time period. However, the multiplex communication system having such a construction requires, as a whole, to implement complicated determination processing, because each node individually determines the necessity of transition to the sleep mode.

Another kind of a multiplex communication system having a master node for controlling slave nodes is disclosed in JP-A-2000-32018, for example. This system, which causes slave nodes to wake up from a sleep mode to render them operative, fails to ensure each node of entering a sleep state and does not make a transition of slave nodes to their sleep mode with reliability under collective management.

SUMMARY OF THE INVENTION

The present invention provides an automotive multiplex communication system capable of determining the fulfillment of conditions to make a transition to a sleep state with a simplified system configuration and with simplified determination processing, and capable of ensuring that the nodes are enabled to enter the sleep state when circumstances are reached in which the sleep state should be entered, even if any one of the nodes is in a communication-disabled state.

According to the present invention, there is provided an automotive multiplex communication system in which a particular communication node and ordinary communication nodes are connected to a multiplex communication path and arranged to make information communications therebetween through the multiplex communication path. Each of the ordinary communication nodes includes ordinary transmission means for delivering first information to the multiplex communication path and sleep-transition control means for causing own node to enter a sleep state. The particular communication node includes instruction means for delivering a sleep-transition command signal to the sleep-transition control means when a communication-continuing request is not determined from the first information.

In the present invention, the ordinary communication nodes make a transition to their sleep state in accordance with the sleep-transition command signal from the particular communication node, and are not required to determine the necessity of transition to the sleep state. Thus, each ordinary communication node is not required of the provision of a program for determining the fulfillment of transition conditions to the sleep state and a memory device for storing such a program and the like.

In this invention, preferably, the particular communication node includes particular transmission means for periodically delivering second information to the multiplex communication path. When the communication-continuing request is not determined from the first information, the instruction means delivers the sleep-transition command signal to the particular transmission means, thereby permitting the particular transmission means to deliver the second information including the sleep-transition command signal. When not receiving the second information from the particular transmission means for a predetermined period, the sleep-transition control means determines that transition conditions to the sleep state are fulfilled and causes the ordinary communication node to enter the sleep state.

Thus, even if the particular communication node is in a communication-disabled state, for instance, the ordinary communication nodes can enter the sleep mode with reliability because the sleep-transition control means in each ordinary communication node determines the fulfillment of conditions for transition to the sleep state when the predetermined period has elapsed.

DETAILED DESCRIPTION OF THE INVENTION

With reference to the appended drawings, an automotive multiplex communication system according to an embodiment of the present invention will be explained.

Figure 1:
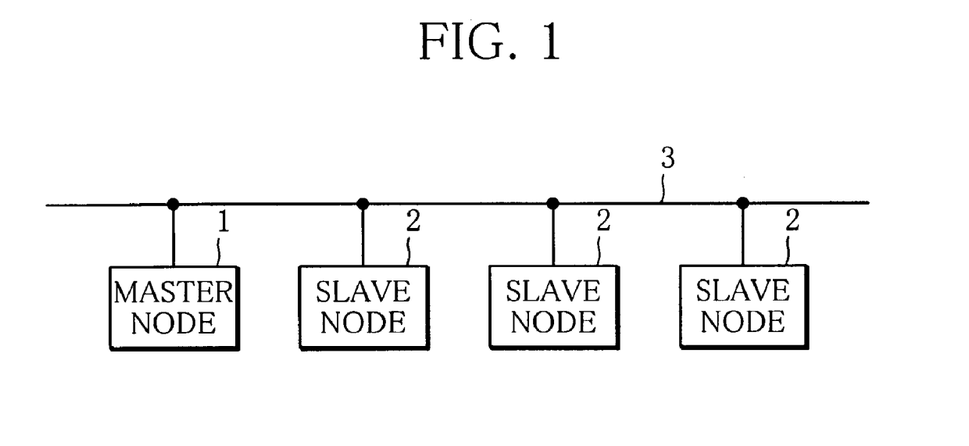
FIG. 1 is a schematic diagram showing connections between a master node, slave nodes and a bus in an automotive multiplex communication system according to an embodiment of the present invention.

As shown in FIG. 1, the multiplex communication system is provided with a master node (particular communication node) 1 and a plurality of slave nodes (ordinary communication nodes) 2, each node being connected to a bus 3 serving as a multiplex communication path. Out of the slave nodes, only three slave nodes are shown in FIG. 1.

Figure 2:
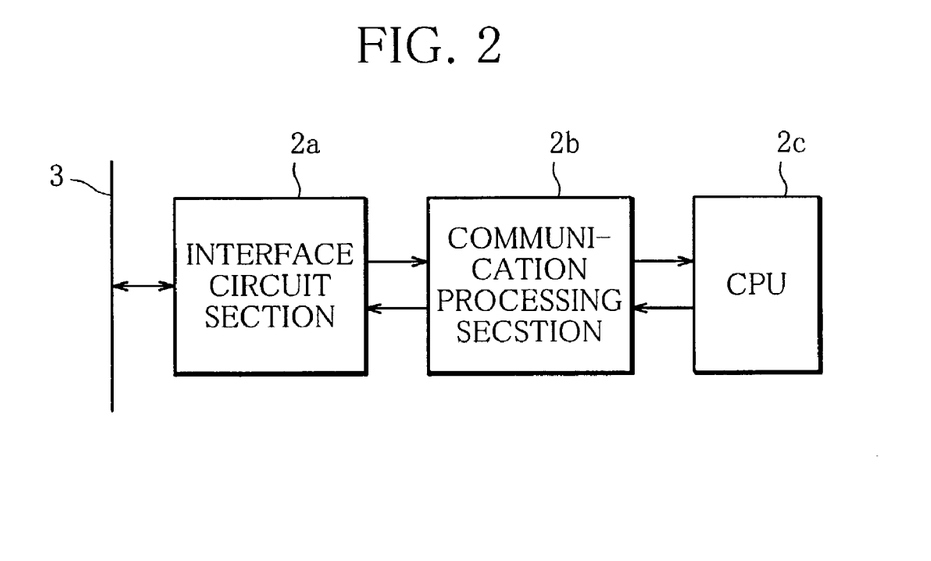
FIG. 2 is a schematic diagram showing the internal arrangement of a slave node shown in FIG. 1.

As shown in FIG. 2, each of the slave nodes 2 is provided with an interface circuit section 2a connected to the bus 3, a communication processing section 2b connected to the interface circuit section 2a, and a CPU 2c connected to the communication processing section 2b. One or more electrical equipment units (not shown), such as a sensor and an actuator, are connected to the CPU 2c. The CPU 2c includes ordinary transmission means (not shown) for delivering a first data frame constituting first information to the bus 3, sleep-transition control means (not shown) for causing own node to enter a sleep state, and a control section for controlling a sensor and an actuator. The first data frame includes a communication-continuing request and data. This data includes a provision request for requesting another node to make data provision, and provision information to be supplied as data to another node.

Although illustrations are omitted, the master node 1 includes an interface circuit section, a communication processing section, a CPU, and a sensor and an actuator that are connected to the CPU, as in the case of the slave nodes 2. The CPU includes particular transmission means for periodically delivering a second data frame constituting second information to the bus 3, sleep-transition control means for causing the own node to enter a sleep state, instruction means for delivering, when not determining a communication-continuing request from the first data frame, a sleep-transition command signal to the particular transmission means, information means for delivering, to the particular transmission means, a provision request for requesting an ordinary communication node to make data provision and provision information to be supplied as data to an ordinary communication node, and a control section for controlling a sensor and an actuator.

Data transfer is performed between the communication nodes to carry out an automobile-driving control in accordance with automobile-driving states, driver's manipulations or the like. For example, in order to control the drive of an actuator, the node associated therewith delivers a data-reception request through the bus to a destination node. In response to such a request, the destination node inputs data from one or more corresponding electrical equipment units and then transmits the input data to the node which delivered the data-reception request.

However, such data transfer is not always implemented. When data transfer is not required, no communication request (i.e., data-transmission or data-reception request) is delivered from any one of the nodes. If such is the case, all the nodes of this embodiment enter a communication-standby mode, i.e., a sleep mode (more generally, sleep state) in which electric power supply to the interface section, the communication control section, and the CPU section of each node is stopped to reduce power consumption. The communication system of this embodiment is provided with the following features to permit all the nodes to make a transition to the sleep mode, even if one or more nodes are unable to communicate.

First, a communication-continuing request flag is provided in transmission data to be delivered from each slave node 2. When a request for communication (data-transmission or data-reception request) is produced in own node, such a slave node 2 sets the communication-continuing flag to a value (e.g., a value of 1) indicative of the presence of a request to continue communication.

Secondly, the master node 1 is adapted to transmit a communication-standby command to all the slave nodes 2 when a state, in which none of the slave nodes 2 delivers a communication-continuing request, continues over a predetermined time period T1. In response to the communication-standby command, each slave node 2 stops delivering transmission data. When such a transmission-restraint state continues over a predetermined time period T, the slave node enters a communication-standby mode, i.e., sleep mode.

That is, a transition determination is performed by the master node 1 based on the presence or absence of a communication-continuing request from each slave node 2. If no communication-continuing request is delivered from any one of the slave nodes 2 for a predetermined time period which is nearly equal to the sum of the two predetermined time periods T1 and T, a transition command is delivered from the master mode 1 to all the slave nodes 2, thereby causing them to enter the sleep mode. Even if any one of the slave nodes 2 becomes unable to communicate, such a slave node 2 becomes only incapable of delivering the communication-continuing request and never affects on the transition determination implemented by the master node 1, whereby the slave nodes 2 can enter the sleep mode. In this manner, the slave nodes 2 are ensured of entering the sleep mode.

Thirdly, each slave node 2 is adapted to enter the sleep mode when it fails to receive data including the communication-standby command flag from the master node 1 over a predetermined time period. Thus, even if the master node 1 becomes unable to communicate, each slave node 2 is permitted to enter the sleep mode.

Figure 3:
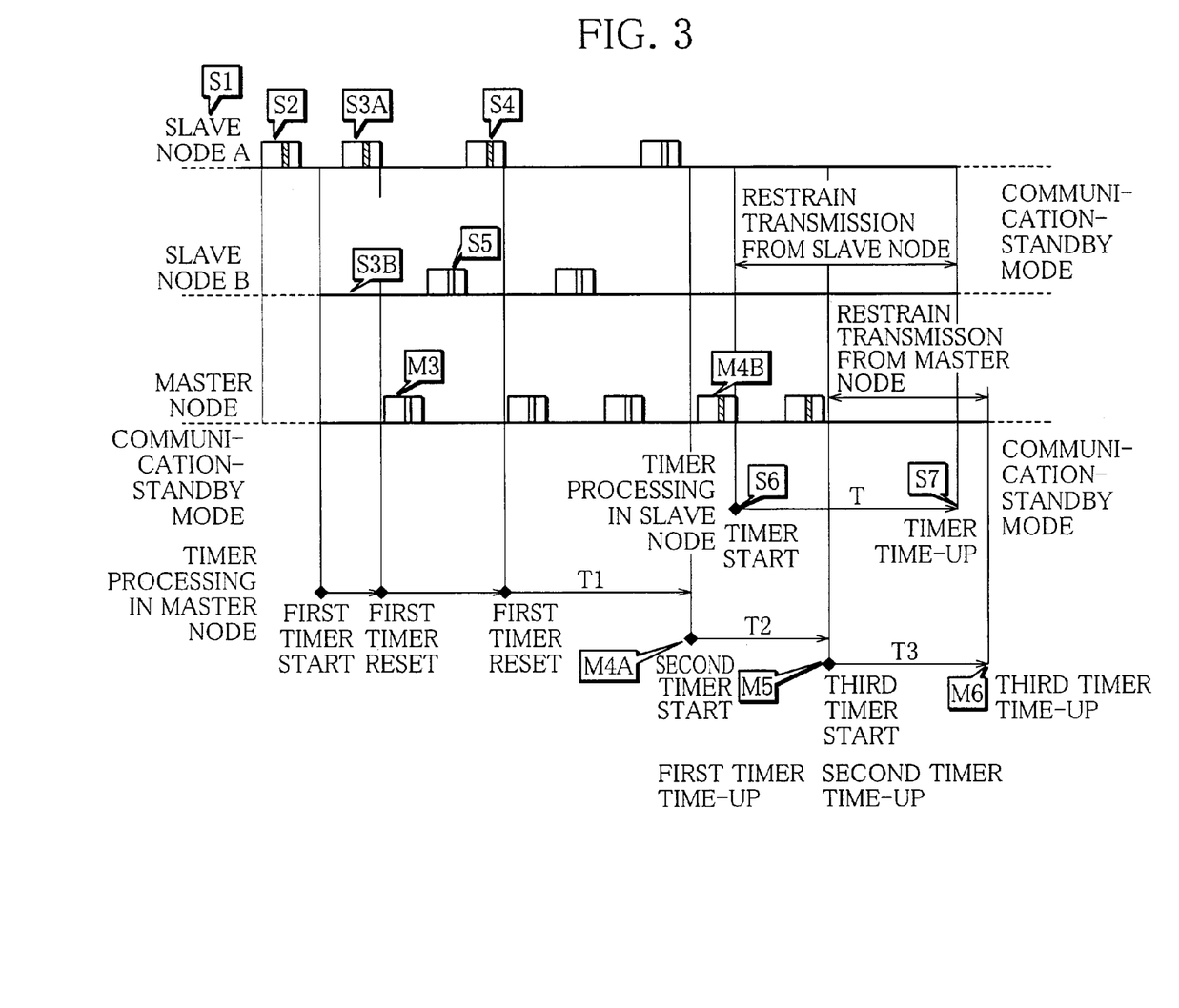
FIG. 3 is a timing chart showing a basic function of the multiplex communication system shown in FIG. 1.

In the following, a basic function of the multiplex communication system of this embodiment will be explained with reference to FIG. 3.

Here, assuming that the master node 1 and all the slave nodes 2 (only two of which are shown by symbols A and B in FIG. 3) are in their sleep state, and subsequently a request for communication (a provision request for requesting another slave node to make information provision) is produced in the slave node A (as shown by symbol S1 in FIG. 3). In response to the request for communication produced in own node, the slave node A delivers a first frame of transmission data that includes a communication-continuing request (S2). In response to this, the other slave nodes (hereinafter referred to as slave nodes B) and the master node 1 wake up and make a transition from their communication-standby mode to their communication-executing mode, whereby these nodes are enabled to start data transmission.

In this manner, the multiplex communication system of this embodiment is adapted to cause all the nodes to wake up in response to a communication request from any one of the nodes. In this regard, a CAN (Controller Area Network), for instance, is employed as an automotive network protocol.

The slave node A of this embodiment delivers twice the first data frame including the communication-continuing request (corresponding to a hatched portion in the data frame) in order to ensure that the master node 1 and the slave nodes B can wake up and to eliminate influences caused by differences in processing ability and in response timing between the individual slave nodes (S2 and S3A).

In response to the first data frame transmitted for the first time (S2) from the slave node A, all or most of the master node 1 and the slave nodes B wake up to enter a state in which they are ready to receive data but are prohibited to make data transmission (S3B). After the first time delivery (S2), in the master node, a first timer starts that measures a time period during which no communication-continuing request is produced. The first timer is reset each time the master node receives, from any one of the slave nodes, a communication-continuing flag having a value of 1 which indicates the presence of communication-continuing request. In response to the secondary transmission (S3A) of the first data frame from the slave node A, those nodes, if any, which did not wake up when the first data frame was transmitted for the first time, wake up without fail, and all the nodes are permitted to make data transmission. In this regard, at least one node receiving the first data frame notifies the remaining nodes, if any, to the effect that data transmission may be made.

Subsequently, as will be understood from the following explanations based on FIGS. 4A, 4B, 5A and 5B, data transfer between associated nodes is generally performed in plural processing cycles. In each processing cycle, the master node first makes communication (M3), and then the slave nodes make communication (S5). If the execution of data transfer temporarily becomes unnecessary, all the nodes enter the sleep state, and then data transfer starts again as required. The following is a description of processes of transition to the sleep state.

Immediately before data transfer temporarily becomes unnecessary, the final data (S4 in FIG. 3) is delivered from any one of the nodes (the slave node A in FIG. 3), and thereafter none of the nodes delivers a communication-continuing request. Even in a state without communication-continuing request, a data frame not including a communication-continuing request is permitted to be delivered until a predetermined time period elapses from when such a state is entered.

If a state where no communication-continuing request is present continues for a predetermined time period T1 from when the slave node A completes the deliver of transmission data including a communication-continuing request (S4), the first timer of the master node is time up and a second timer is started (M4A). Further, a second data frame including a sleep-transition command signal (corresponding to the hatched portion in the data frame) is delivered from the master node 1 (M4B). The second data frame is periodically delivered to the bus 3 from particular transmission means of the master node. In response to the sleep-transition command signal, all the slave nodes A and B stop delivering data, and a timer of each slave node starts measuring a time period during which the slave node is in a transmission-restraint state (S6).

If a state where data transmission from the slave nodes is kept stopped continues for a predetermined time period T under a condition that the master node continues to deliver the second data frame including the communication-standby command serving as the sleep-transition command signal and none of the slave nodes does not deliver a communication-continuing request, the timer of each slave node is time up (S7). In response to this, all the slave nodes are transferred from their communication-executing mode to their communication-standby mode (i.e., sleep mode).

If a state of producing no communication-continuing request continues for a predetermined time period T2 after the start of the time measurement by the second timer of the master node, i.e., after the start of delivery of the second data frame, the master node is prohibited to deliver data (M5). The master node enters a data-transmission restraint period. The second timer of the master node is time up and a third timer starts. When a state where no communication-continuing request by means of a first data frame is present continues for a predetermined time period T3 after the master node enters the data-transmission restraint period, the third timer is time up, and the master node is transferred from the communication-executing mode to the communication-standby mode (M6).

With reference to FIGS. 4A, 4B, 5A and 5B, the operation of the multiplex communication system according to this embodiment will be explained in detail.

Figure 4A:
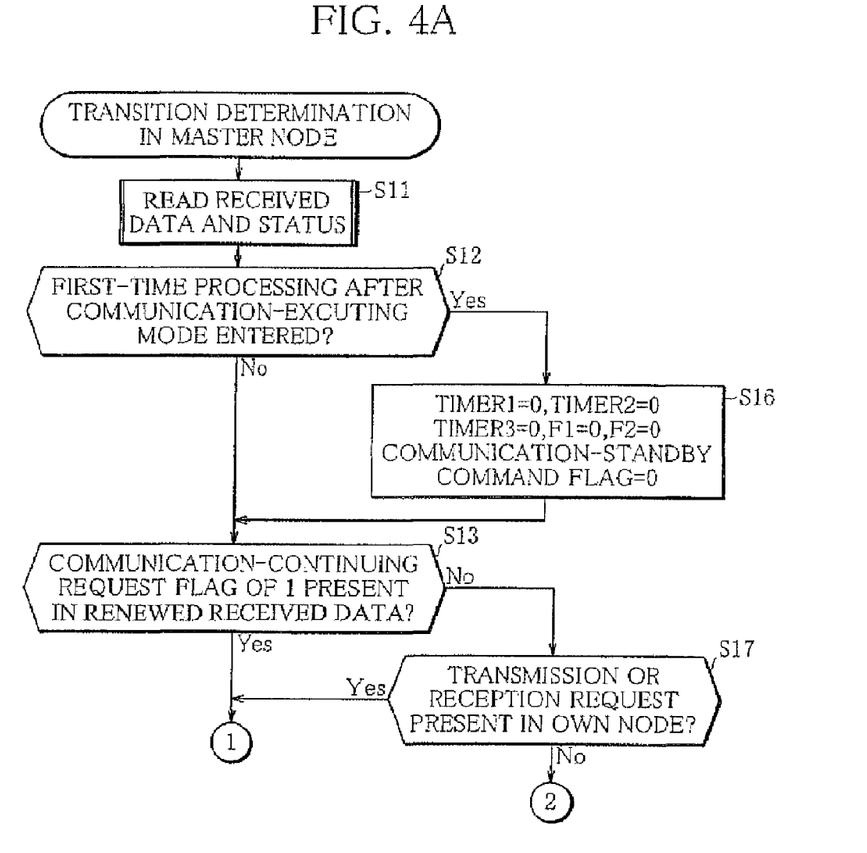
FIG. 4A is a flowchart showing part of a determination routine executed by the master node shown in FIG. 1 for determining whether conditions are fulfilled for transition from a communication-executing mode to a communication-standby mode.
Figure 4B:
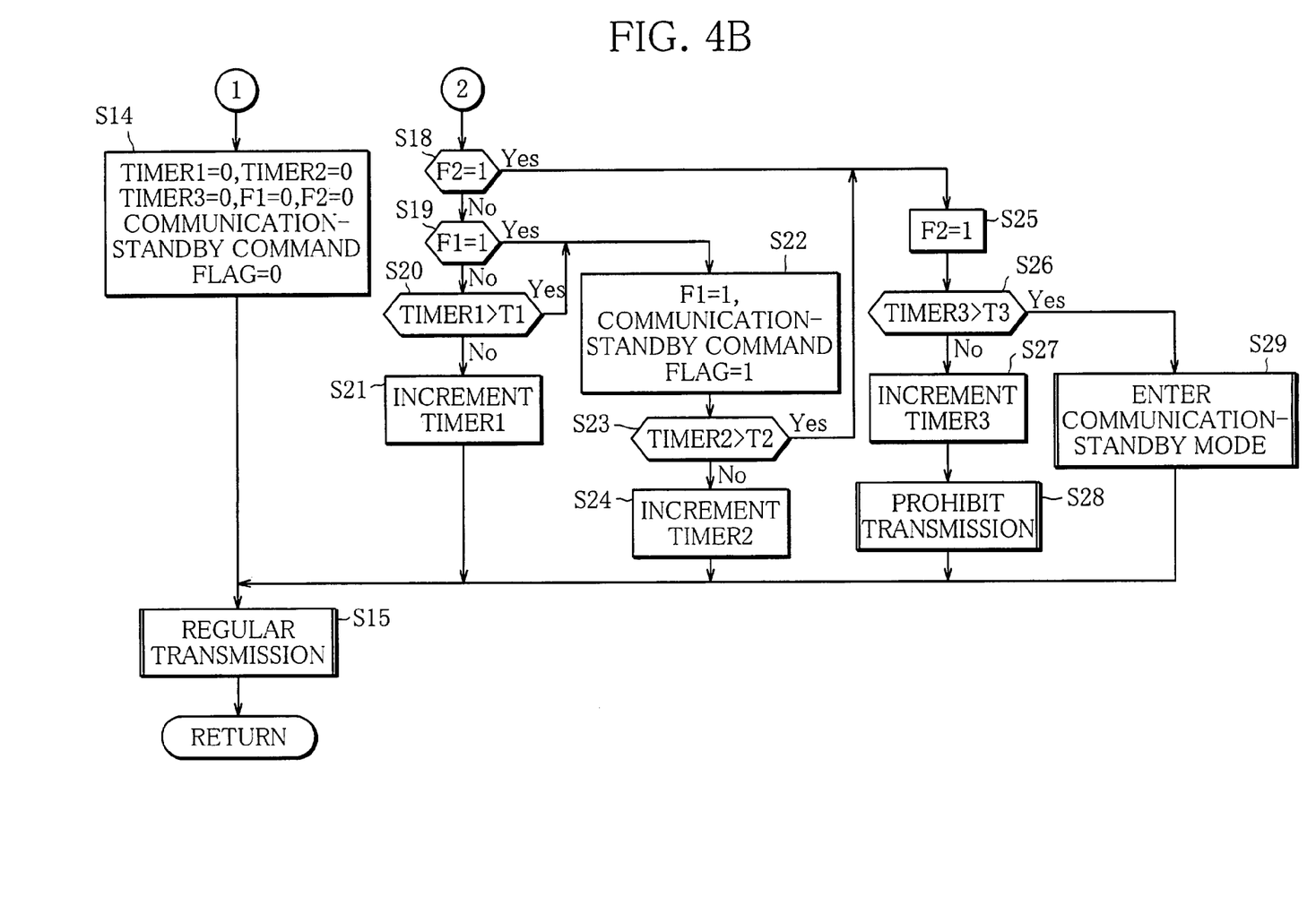
FIG. 4B is a flowchart showing the remaining part of the determination routine.

The master node 1 repeatedly carries out a determination routine shown in FIGS. 4A and 4B at intervals of a predetermined cycle, in order to determine whether or not a transition should be made from a communication-executing mode to a communication-standby mode.

In this routine, the master node 1 which operates in the communication-executing mode reads received data and own status (step S11), and then determines whether the first-time processing is to be made in the present cycle after the communication-executing mode is entered (step S12). If it is determined that the first-time processing was already made, the master node determines whether or not the received data (renewed data) read in Step S11 includes a communication-continuing request (communication-continuing request flag having a value of 1) (step S13).

If the renewed received data includes a communication-continuing request, the first to third timers, the first and second flags, and the communication-standby command flag serving as sleep-transition command signal are reset to a value of 0, respectively, and then regular transmission is implemented (steps S14 and S15), whereupon the determination processing at the present cycle ends.

In the determination routine shown in FIGS. 4A and 4B, the first timer measures a time period during which none of the slave nodes 2 delivers a communication-continuing request and no communication request is present in the master node 1. When such a state (hereinafter referred to as the state without communication request) continues over a first predetermined time period T1 (e.g., two seconds), the first flag F1 is set at a value of 1. This data is delivered as the communication-standby command (sleep-transition command signal) to the slave nodes. When the state without communication request further continues over a second predetermined time period T2 (e.g., one second), a second flag F2 is set at a value of 1, whereby particular transmission means of the master node prevents the master node from delivering provision information. When such a state still further continues over a third predetermined time period T3 (e.g., two seconds), the communication-standby mode (sleep mode) is entered.

The above operation will be further explained with reference to the flow shown in FIGS. 4A and 4B.

If no communication-continuing request is delivered from the slave nodes and at the same time no communication request is present in the master node 1, the flow advances from step S17 to step S18 in which a determination is made as to whether or not the second flag F2 has a value of 1. In that case, the determination at step S18 produces a negative (No) answer, and hence the flow advances from step S18 to step S19 in which whether or not the first flag F1 has a value of 1 is determined. Here, the determination at step S19 produces a negative answer, whereupon a determination is made at step S20 as to whether a count value TIMER1 in the first timer exceeds a value corresponding to a predetermined time period T1. Here, this determination produces a negative answer, so that the count value TIMER1 in the first timer is incremented at step S21, and then the regular transmission is performed at step S15, whereupon the determination processing in the present cycle ends.

Figure 5A:
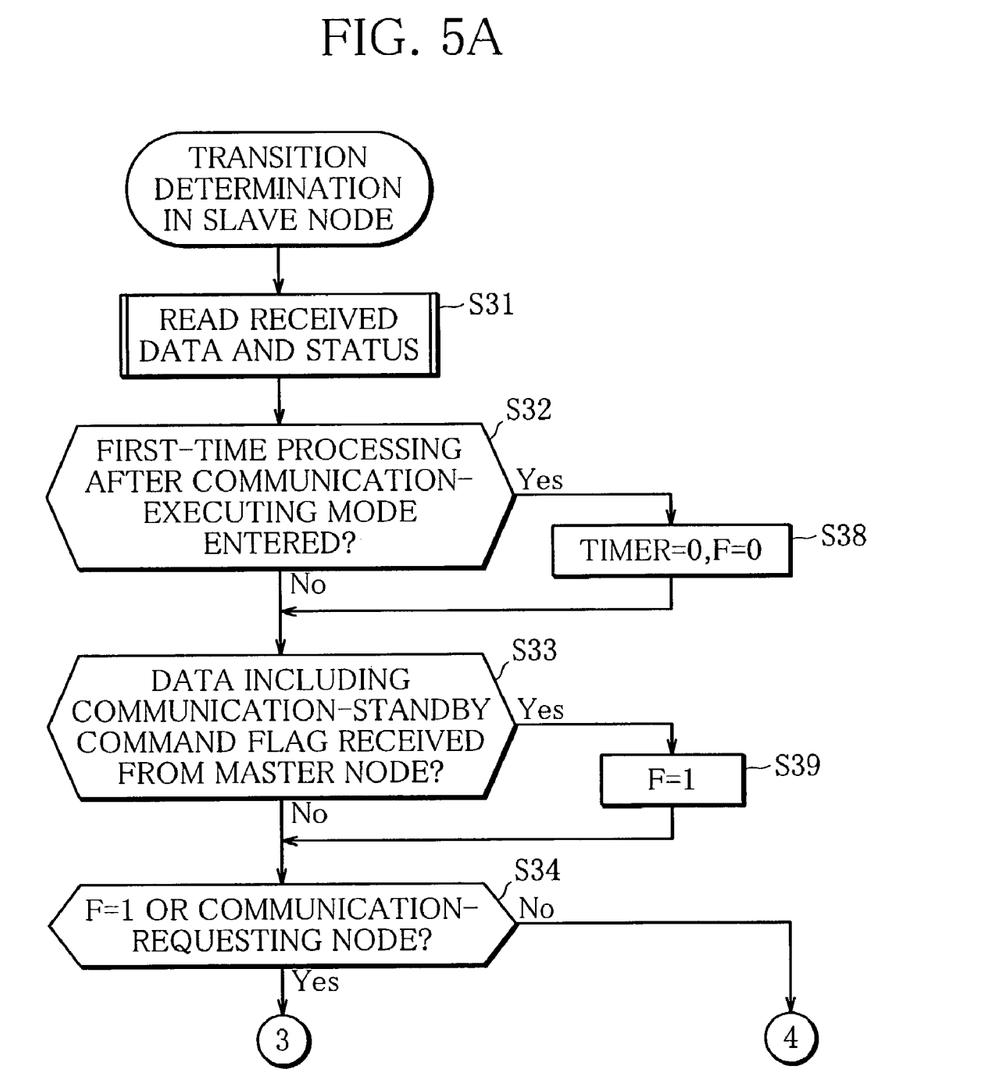
FIG. 5A is a flowchart showing part of a determination routine executed by each slave node shown in FIG. 1.

Thereafter, if the state without communication request continues over a predetermined time period T1 to thereby produce an affirmative (Yes) answer at the determination in step S20, the flow enters step S22 in which the first flag F1 and the communication-standby command flag are set to a value of 1, respectively, and this flag data is delivered as a communication-standby command (sleep-transition command signal) to each slave node 2 and used in a determination at step S33 in FIG. 5A. Then, a determination is made as to whether or not a count value TIMER2 in the second timer exceeds a value corresponding to a predetermined time period T2 (step S23). Here, the determination at step S23 produces a negative answer, and thus the count value TIMER 2 in the second timer is incremented at step S24, and the flow enters step S15.

As apparent from the foregoing explanation, the master node 1 serves, in step S17, as determination means for determining the presence or absence of a communication request in own node, and serves, in step S22, as instruction means for delivering a transition command.

Subsequently, when the delivery of the communication-standby command continues for a predetermined time period T2 in the state without communication request so that the determination at step S23 produces an affirmative answer, the flow advances from step S23 to step S25 in which the second flag F2 is set to a value of 1. Next, a determination is made at step S26 as to whether or not a count value TIMER3 in the third timer exceeds a value corresponding to a predetermined time period T3. Here, the determination at step S26 produces a negative answer, so that the count value TIMER3 in the third timer is incremented and then data transmission from the master node 1 is prohibited (steps S27 an S28), whereby the particular transmission means of the master node prevents the master node from delivering provision information. As a result, the master node 1 is in a data-transmission restraint state but is permitted to make data reception. By providing such a data-transmission restraint period (data-transmission prohibiting means), the master node is ensured of promptly receiving a communication-continuing request, if any, from a slave node.

Subsequently, if the state without communication request further continues over a predetermined time period T3 so that the determination at step S26 produces an affirmative answer, the master node 1 enters the communication-standby mode (sleep mode) (step S29), whereupon the determination processing at the present cycle ends.

Figure 5B:
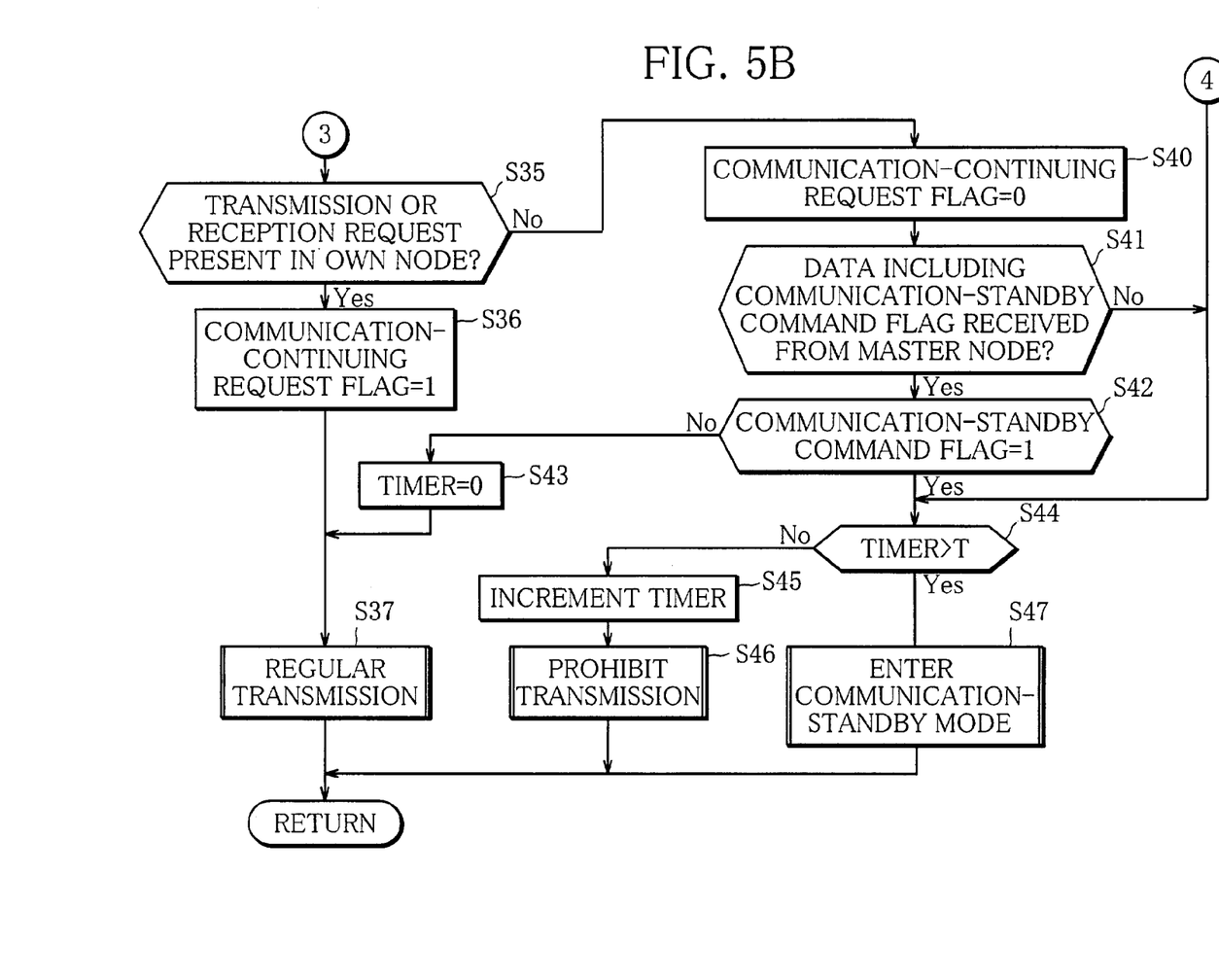
FIG. 5B is a flowchart showing the remaining part of the determination routine.

Each of the slave nodes 2 repeatedly executes a determination routine shown in FIGS. 5A and 5B at intervals of a predetermined cycle in order to determine whether a transition should be made from a communication-executing mode to a communication-standby mode.

In the determination routine, the slave node 2 which operates in the communication-executing mode reads received data and own status (step S31), and then determines whether the first-time processing is to be made in the present cycle after the communication-executing mode is entered (step S32). If the first-time processing is to be made in the present cycle, the flow advances from step S32 to step S38 in which a count value TIMER in the timer of the slave node 2 and a flag F are reset to a value of 0, respectively, whereupon the flow advances to step S33. On the other hand, the first-time processing was already made, the flow advances from step S32 to step S33 in which whether or not data including a communication-standby command flag is received from the master node 1 is determined.

If data including a communication-standby command flag is received, the flow advances from step S33 to step S34 via step S39 in which the flag F is set to a value of 1. On the other hand, if such a data is not received, the flow advances from step S33 to step S34.

In step S34, the slave node 2 determines whether or not the flag F has a value of 1 or whether or not the own node operates as a communication-requesting node (which is one in which data transmission or data reception becomes necessary while it operates in the communication-standby mode) (step S34). If this determination produces an affirmative answer, the slave node 2 further determines whether or not a communication request (data transmission or data reception request) is present in own node (step S35). If it is determined at step S35 that a communication request is present in own node 2, the communication-continuing request flag is set to a value of 1, and regular transmission is performed (steps S36 and S37), whereupon the determination processing at the present cycle ends.

As mentioned above, the slave node 2 serves, at step S35, as determination means for determining the presence or absence of a communication request in own node, and serves, at step S36, as transmission means for delivering a communication request.

On the other hand, if it is determined at step S35 that no communication request is present in own node 2, the slave node 2 resets the communication-continuing request flag at a value of 0 (step S40), and then determines whether or not data including a communication-standby command flag is received from the master node 1 (step S41). If the determination produces an affirmative answer, the slave node 2 determines whether or not the communication-standby command flag in the received data from the master node has a value of 1 (step S42). If this determination produces a negative answer, that is, if no communication-standby command is received from the master node, the count value TIMER in the timer is reset to a value of 0 (step S43), and then regular transmission is performed (step S37), whereupon the determination routine in the present cycle ends.

As mentioned above, when the slave node 2 determines at step S35 that a communication request is not present in own node, the determination routine advances from step S35 via step S40 to step S41 in which whether data including a communication-standby command flag is received from the master node 1 is determined, and if this determination produces an affirmative answer, the slave node 2 determines at step S42 whether the communication-standby command flag in the data received from the master node 1 has a value of 1. On the contrary, if the determination result at step S42 is affirmative, i.e., if the communication-standby command is received from the master node, the slave node 2 determines whether the count value TIMER of the timer of the slave node exceeds a value corresponding to a predetermined time period T, e.g., three seconds (step S44). Here, the determination at step S44 produces a negative answer, and hence the count value TIMER of the timer is incremented and then data transmission is prohibited (steps S45 and S46). That is, the slave node prevents the own node from delivering provision information. Whereupon the determination processing at the present cycle ends. Thus, in response to a communication-standby command from the master node 1, the slave node 2 stops making transmission.

If a state where no communication request in own node 2 is present and a communication-standby command from the master node 1 is present continues for a time period longer than the predetermined time period T, the slave node 2 enters the communication-standby mode (sleep mode) (step S47), whereupon the determination processing at the present cycle ends. The provision of the transmission-restraint period (data-transmission prohibiting means) for the slave node 2 makes it possible to prevent inconveniences in making a transition to the sleep mode, which would otherwise be caused due to differences between individual slave nodes in their processing ability and response timing. In step S44, the slave node 2 serves as determination means for determining the fulfillment of conditions for transition to the sleep mode.

If the slave node 2 operating in the communication-executing mode is retained for a predetermined time period T in a state where it does not receive data including the communication-standby command from the master node 1, the determination at steps S44, coming from the No branch at step S34 in FIG. 5A, produces an affirmative answer, so that the slave node 2 enters the communication-standby mode (step S47). Also, the communication-standby mode is entered when a determination at step S44 coming from the No branch at step S41 produces an affirmative answer as a result that the slave node 2 is retained for the predetermined time period T in a state where data including the communication-standby command is not received. The time period T starts when data including a communication-standby command flag is received and the flag F is set at a value of 1. As a consequence, the slave node 2 is permitted to make a transition to the sleep mode, even if the master node 1 becomes unable to communicate.

The term "sleep transition" or "transition to sleep mode" of a node used in the explanations of the foregoing embodiment indicates that the interface section of the node first enters the sleep mode, and then the communication processing section and the CPU section thereof enter the sleep mode in this order.

The present invention is not limited to the foregoing embodiment and may be modified in various manners.

For instance, the multiplex communication system according to the foregoing embodiment is configured to have the master node 1 for monitoring all the slave nodes 2. Alternatively, the multiplex communication system may be provided with a plurality of such master nodes. The configuration of the master and slave nodes is not limited to the one shown in FIG. 2, and may be modified in various manners as long as each node is selectively operable in a communication-executing mode or a communication-standby mode. The multiplex communication system is not limited to the one having a bus-type network as illustrated, and may be of a ring-type network, for instance.

In the embodiment, each slave node is arranged to enter the sleep mode after receiving the communication-standby command from the master mode for a predetermined period T. Alternatively, each slave node may be configured to enter the sleep mode immediately when it has once received the communication-standby command.

Although the transmission-restraint period T in the embodiment continues even after the elapse of the communication-standby command delivery period T2 associated with the master node 1, such a period T2 may be longer than the transmission-restraint period T, thereby ensuring that the slave node enters the sleep mode.

The invention claimed is:

1. An automotive multiplex communication system, comprising:
    a particular communication node;
    ordinary communication nodes having an interface section, a communication processing section connected to the interface circuit section, and a CPU connected to the communication processing section; and
    a multiplex communication path to which the particular communication node and the interface circuit section of the ordinary communication nodes are connected, such that information communications are made therebetween through the multiplex communication path, wherein
    each of said ordinary communication nodes includes ordinary transmission means for delivering first information to the multiplex communication path and sleep-transition control means for causing own node to enter a sleep state, in which the interface section first enters the sleep state, and the communication processing section and the CPU enter the sleep state thereafter; and
    said particular communication node includes instruction means for delivering a sleep-transition command signal to the sleep-transition control means when a communication-continuing request is not determined from the first information.

2. The automotive multiplex communication system according to claim 1, wherein said first information includes the communication-continuing request and data.

3. The automotive multiplex communication system according to claim 2, wherein said data includes a provision request for requesting another node to make data provision and includes provision information to be supplied to another node.

4. The automotive multiplex communication system according to claim 3, wherein said ordinary transmission means prevents the provision information from being delivered, when said ordinary transmission means receives the sleep-transition command signal.

5. The automotive multiplex communication system according to claim 1, wherein said particular communication node includes particular transmission means for periodically delivering second information to the multiplex communication path,
    said instruction means delivers the sleep-transition command signal to the particular transmission means when the communication-continuing request is not determined from the first information, thereby permitting said particular transmission means to deliver the second information including the sleep-transition command signal, and
    said sleep-transition control means determines that transition conditions to the sleep state are fulfilled and causes the ordinary communication node to enter the sleep state, when said sleep-transition control means does not receive the second information from the particular transmission means for a predetermined period.

6. The automotive multiplex communication system according to claim 5, wherein said particular communication node includes sleep-transition control means and information means for delivering, to said particular transmission means, a provision request for requesting an ordinary communication node to make data provision and provision information to be supplied to an ordinary communication node, and permits own node to enter the sleep state when a predetermined time period has elapsed without producing the provision request after completion of the sleep-transition command signal being delivered.

7. The automotive multiplex communication system according to claim 6, wherein said particular transmission means prevents the provision information from being delivered in the predetermined time period.

8. The automotive multiplex communication system according to claim 1, wherein said particular communication node enters into a restrain transmission mode for a predetermined period of time, after delivering the sleep-transition command signal, in which said particular communication node is in a data-transmission restraint state but is permitted to receive data from said ordinary communication nodes.

9. An automotive multiplex communication system, comprising:
a particular communication node;
ordinary communication nodes; and
a multiplex communication path to which the particular communication node and the interface circuit section of the ordinary communication nodes are connected, such that information communications are made therebetween through the multiplex communication path, wherein
each of said ordinary communication nodes includes ordinary transmission means for delivering first information to the multiplex communication path and sleep-transition control means for causing own node to enter a sleep state; and
said particular communication node includes instruction means for delivering a sleep-transition command signal to the sleep-transition control means when a communication-continuing request is not determined from the first information, and
wherein said first information includes the communication-continuing request and data,
wherein said data includes a provision request for requesting another node to make data provision and includes provision information to be supplied to another node, and
wherein said ordinary transmission means prevents the provision information from being delivered, when said ordinary transmission means receives the sleep-transition command signal.

10. An automotive multiplex communication system, comprising:
a particular communication node;
ordinary communication nodes; and
a multiplex communication path to which the particular communication node and the interface circuit section of the ordinary communication nodes are connected, such that information communications are made therebetween through the multiplex communication path, wherein
each of said ordinary communication nodes includes ordinary transmission means for delivering first information to the multiplex communication path and sleep-transition control means for causing own node to enter a sleep state; and
said particular communication node includes instruction means for delivering a sleep-transition command signal to the sleep-transition control means when a communication-continuing request is not determined from the first information,
wherein said particular communication node includes particular transmission means for periodically delivering second information to the multiplex communication path,
said instruction means delivers the sleep-transition command signal to the particular transmission means when the communication-continuing request is not determined from the first information, thereby permitting said particular transmission means to deliver the second information including the sleep-transition command signal, and
said sleep-transition control means determines that transition conditions to the sleep state are fulfilled and causes the ordinary communication node to enter the sleep state, when said sleep-transition control means does not receive the second information from the particular transmission means for a predetermined period, and
wherein said each of said ordinary transmission means delivers the first information after completion of delivery of information from said particular transmission means.

11. An automotive multiplex communication system, comprising:
a particular communication node;
ordinary communication nodes; and
a multiplex communication path to which the particular communication node and the interface circuit section of the ordinary communication nodes are connected, such that information communications are made therebetween though the multiplex communication path, wherein
each of said ordinary communication nodes includes ordinary transmission means for delivering first information to the multiplex communication path and sleep-transition control means for causing own node to enter a sleep state; and
said particular communication node includes instruction means for delivering a sleep-transition command signal to the sleep-transition control means when a communication-continuing request is not determined from the first information,
wherein said particular communication node includes particular transmission means for periodically delivering second information to the multiplex communication path,
said instruction means delivers the sleep-transition command signal to the particular transmission means when the communication-continuing request is not determined from the first information, thereby permitting said particular transmission means to deliver the second information including the sleep-transition command signal, and
said sleep-transition control means determines that transition conditions to the sleep state are fulfilled and causes the ordinary communication node to enter the sleep state, when said sleep-transition control means does not receive the second information from the particular transmission means for a predetermined period,
wherein said particular communication node includes sleep-transition control means and information means for delivering, to said particular transmission means, a provision request for requesting an ordinary communication node to make data provision and provision information to be supplied to an ordinary communication node, and permits own node to enter the sleep state when a predetermined time period has elapsed without producing the provision request after completion of the sleep-transition command signal being delivered, and wherein said particular transmission means prevents the provision information from being delivered in the predetermined time period.

12. The automotive multiplex communication system according to any one of claims 5–7 or 11, wherein said each of said ordinary transmission means delivers the first information after completion of delivery of information from said particular transmission means.

* * * * *